UNITED STATES PATENT OFFICE.

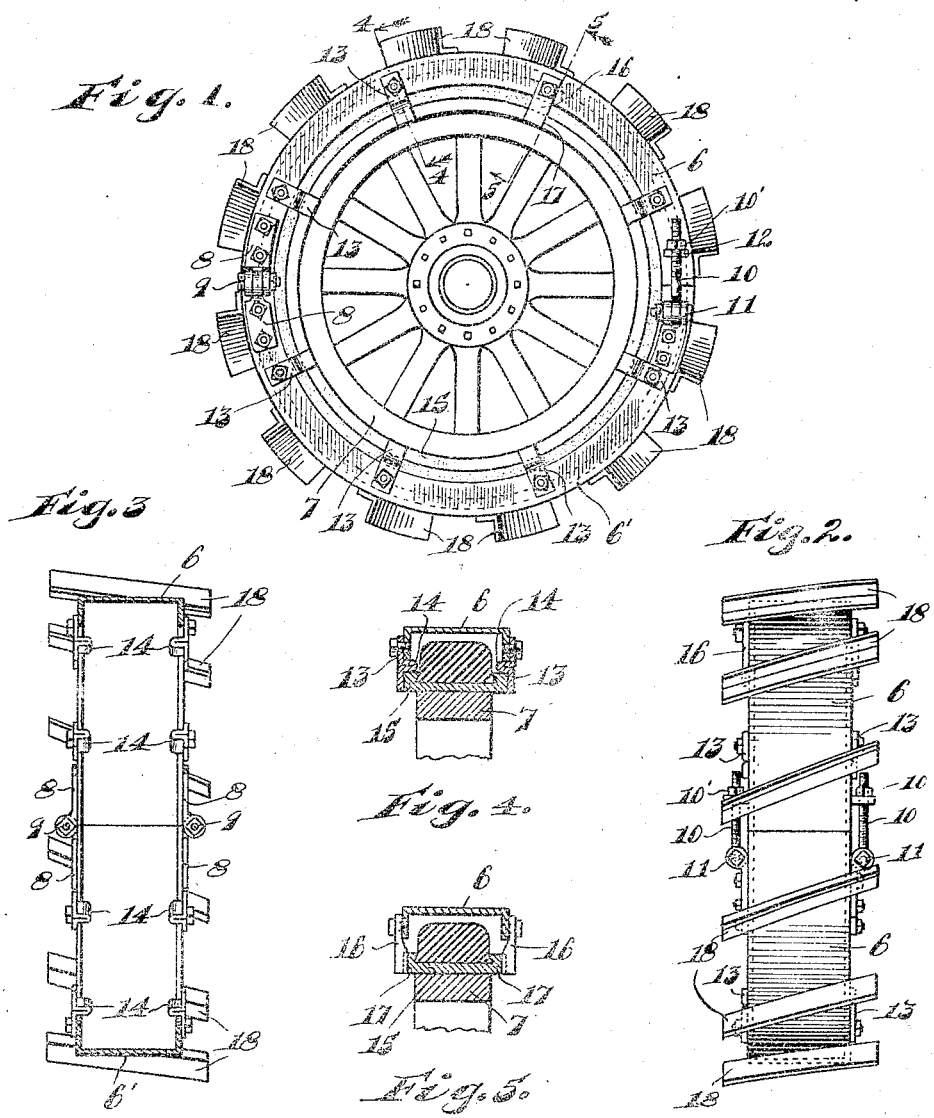

LEONARD S. SZUMKOWSKI, OF CHICAGO, ILLINOIS, ASSIGNOR TO URSUS MOTOR COMPANY, OF CHICAGO, ILLINOIS, A CORPORATION OF ILLINOIS.

TRACTOR-TREAD FOR VEHICLE-WHEELS.

1,364,219.     Specification of Letters Patent.     Patented Jan. 4, 1921.

Application filed August 6, 1918. Serial No. 248,554.

*To all whom it may concern:*

Be it known that I, LEONARD S. SZUMKOWSKI, a citizen of the United States, and a resident of the city of Chicago, county of Cook, and State of Illinois, have invented certain new and useful Improvements in Tractor-Treads for Vehicle-Wheels, of which the following is a specification.

My invention relates to improvements in vehicle wheels, and has for its object the production of a tractor tread for vehicle wheels which will permit of ready employment of a conventional vehicle wheel for tractor or other purposes where firm engagement with the ground is desired. A further object is the production of a tractor tread attachment which will be of durable and economical construction and which will permit of ready and expeditious attachment and detachment.

Other objects will appear hereinafter.

The invention consists in the combinations and arrangements of parts hereinafter described and claimed.

The invention will be best understood by reference to the accompanying drawings forming a part of this specification, and in which, Figure 1, is a side elevation of a vehicle wheel equipped with a tractor tread, embodying the invention, Fig. 2, a front elevation of the same, Fig. 3, a transverse section through the tread, and Figs. 4 and 5, detail sections taken on lines 4—4 and 5—5, respectively, of Fig. 1.

The preferred form of construction, as illustrated in the drawings, comprises an annular tread formed of a plurality of arcuate sections 6 and 6′, each of which is of channel form, with the channel facing inwardly. Said sections, when arranged end to end in operative relation, form a complete circle which is adapted to fit over the wheel 7 in connection with which the device is employed. The tread is of greater diameter than the wheel, the tire of the wheel however being adapted for reception in the channel of the tread, as clearly seen in Figs. 4 and 5. The ends of tread sections 6 and 6′ at one side of the wheel are connected by straps 8 secured to said sections, at the adjacent ends of which are formed interlocking lugs which are engaged by bolts 9, as clearly seen in Figs. 1 and 3. The opposite ends of sections 6 and 6′ are connected by adjusting bolts 10, which are pivotally connected at 11 with the sections 6′, the free ends of said bolts being adapted to engage with recessed lugs 12 which project from opposite sides of section 6. By means of nuts 10′ threaded upon the bolts 10 and which are adapted to engage with the lugs 12, it will be seen that the sections 6 and 6′ may be drawn toward each other into operative position about the wheel. Secured to the periphery of members 6 and 6′ are angle irons 18 disposed thereon at suitable intervals diagonally transverse of said members.

Spaced about and rigidly secured to the tread members 6 and 6′ at the opposite sides of the same are spacing members 13, the inner ends of which are inwardly offset to form shoulders 14 which are adapted to engage with the outer edges of the rim 15 of the wheel, the extreme inner ends of members 13 engaging against the sides of said rim, as clearly seen in Fig. 4. Thus, through this angular formation of the inner ends of members 13, the tread member is held firmly in position against all possible movement except relative rotary movement. To guard against such movement, however, the section 6 is formed with inwardly projecting members 16 which engage with laterally opening notches 17 formed in the sides of the rim 15 of the wheel. When the members 16 are engaged with the notches 17, it is, of course, apparent that the tread and wheel are positively locked against relative rotary movement. To remove the sections 6 and 6′ from the wheel, the nut 10′ is loosened to allow disengagement of the bolt 10 from the member 12. The bolt 9 is then withdrawn from the co-acting lugs on member 8, and these sections can then be lifted off the wheel, as will be readily understood.

With the construction set forth it will be seen that an arrangement it provided which will permit of ready and expeditious application or removal, and further, one which will guard and protect the tire of the wheel to which it is applied against any possible injury which might otherwise result did the tread member rest against the tire of the wheel. The members 6 and 6′ are provided at their outer sides with cleats 18 to insure against any possible slipping.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

The combination with a vehicle wheel having a rim and a resilient tire therein, of a tractor tread having a diameter greater than said tire and provided with side flanges, said tread being applied about said tire with the side flanges on opposite sides thereof, a plurality of inwardly extending members secured to the side flanges and engaging against the outside of the rim on opposite sides thereof, said members having shoulders between said flanges and said rim and seating against the latter, and a member secured to each of the side flanges and engaging in a notch in the rim.

In testimony whereof I have signed my name to this specification in the presence of two subscribing witnesses.

LEONARD S. SZUMKOWSKI.

Witnesses:
ARTHUR A. OLSON,
HELEN F. LILLIS.